US005896739A

United States Patent [19]

Snyder et al.

[11] Patent Number: 5,896,739

[45] **Date of Patent: *Apr. 27, 1999**

[54] METHOD OF DISGORGING FLAMES FROM A TWO STREAM TANGENTIAL ENTRY NOZZLE

[75] Inventors: Timothy S. Snyder, South Windsor; William A. Sowa, Simsbury, both of Conn.; Stephen K. Kramer, Stuart, Fla.

[73] Assignee: United Technologies Corporation, Hartford, Conn.

[ * ] Notice: This patent is subject to a terminal disclaimer.

[21] Appl. No.: 08/771,409

[22] Filed: Dec. 20, 1996

[51] Int. Cl.$^{6}$ .......... F02C 7/20

[52] U.S. Cl. .......... 60/39.06; 60/737; 60/748

[58] Field of Search .......... 60/737, 738, 740, 60/747, 748; 239/403, 470, 432, 434, 504, 400; 431/352, 353

[56] References Cited

U.S. PATENT DOCUMENTS

| | | | |
|---|---|---|---|
| 3,605,405 | 9/1971 | Du Bell et al. | 60/748 |
| 5,154,059 | 10/1992 | Keller | 60/737 |
| 5,307,634 | 5/1994 | Hu | 60/737 |
| 5,461,865 | 10/1995 | Snyder et al. | 60/737 |
| 5,622,054 | 4/1997 | Tingle | 60/737 |
| 5,671,597 | 9/1997 | Butler et al. | 60/748 |
| 5,673,552 | 10/1997 | Idleman et al. | 60/748 |
| 5,680,766 | 10/1997 | Joshi et al. | 60/737 |
| 5,699,667 | 12/1997 | Joos | 60/737 |
| 5,761,897 | 6/1998 | Kramer | 60/737 |

*Primary Examiner*—Charles G. Freay
*Assistant Examiner*—Ted Kim
*Attorney, Agent, or Firm*—Christopher T. Hayes

[57] ABSTRACT

A method of reducing the tendency of the combustion flame to stabilize within the mixing zone of a tangential entry nozzle is disclosed which comprises mixing fuel and air in a mixing zone within a fuel nozzle assembly, thereby producing a first fuel/air mixture which is isolated from the combustion products by maintaining sufficiently high axial velocities throughout the mixing zone and using a combination of a second internal passageway within a centerbody (either fueled or unfueled) and the surfaces of the combustor inlet port.

1 Claim, 3 Drawing Sheets

METHOD OF DISGORGING FLAMES FROM A TWO STREAM TANGENTIAL ENTRY NOZZLE

TECHNICAL FIELD

This invention relates to low NOx premix fuel nozzles, and particularly to such nozzles for use in gas turbine engines.

BACKGROUND OF THE INVENTION

The production of nitrous oxides (hereinafter "NOx") occurs as a result of combustion at high temperatures. NOx is a notorious pollutant, and as a result, combustion devices which produce NOx are subject to ever more stringent standards for emissions of such pollutants. Accordingly, much effort is being put forth to reduce the formation of NOx in combustion devices.

One solution has been to premix the fuel with an excess of air such that the combustion occurs with local high excess air, resulting in a relatively low combustion temperature and thereby minimizing the formation of NOx. A tangential entry fuel nozzle which so operates is shown in U.S. Pat. No. 5,307,634, which discloses a scroll swirler with a conical center body. The scroll swirler comprises two offset cylindrical-arc scrolls connected to two endplates. Combustion air enters the swirler through two rectangular slots formed by the offset scrolls, and exits through a combustor inlet in one endplate and flows into the combustor. A linear array of orifices located on the outer scroll opposite the inner trailing edge injects fuel into the airflow at each inlet slot from a manifold to produce a uniform fuel air mixture before exiting into the combustor.

Premix fuel nozzles of this type have demonstrated low emissions of NOx relative to fuel nozzles of the prior art. Unfortunately, the nozzle experienced durability problems related to severe deterioration of the centerbody as a result of the flame stabilizing within the premixing volume of the nozzle. As a result, the operational life of such nozzles when used in gas turbine engines has been limited.

What is needed is a method of combustion that significantly reduces the tendency of the combustion flame to stabilize inside of the fuel nozzle, and tends to disgorge any flame that does migrate into the mixing zone of the fuel nozzle.

SUMMARY OF THE INVENTION

It is therefore an object of the present invention to provide a method of combustion which significantly reduces the tendency of the combustion flame to stabilize within a tangential entry nozzle.

Accordingly, a method of preventing the tendency of the combustion flame to stabilize within a tangential entry nozzle is disclosed which comprises mixing fuel and air in a mixing zone within a fuel nozzle, and combusting the mixture downstream of the throat of a combustor inlet port while isolating the combustion products from the mixed fuel and air within the nozzle at all operating conditions of the engine.

DESCRIPTION OF THE PREFERRED EMBODIMENT

Figure 1:
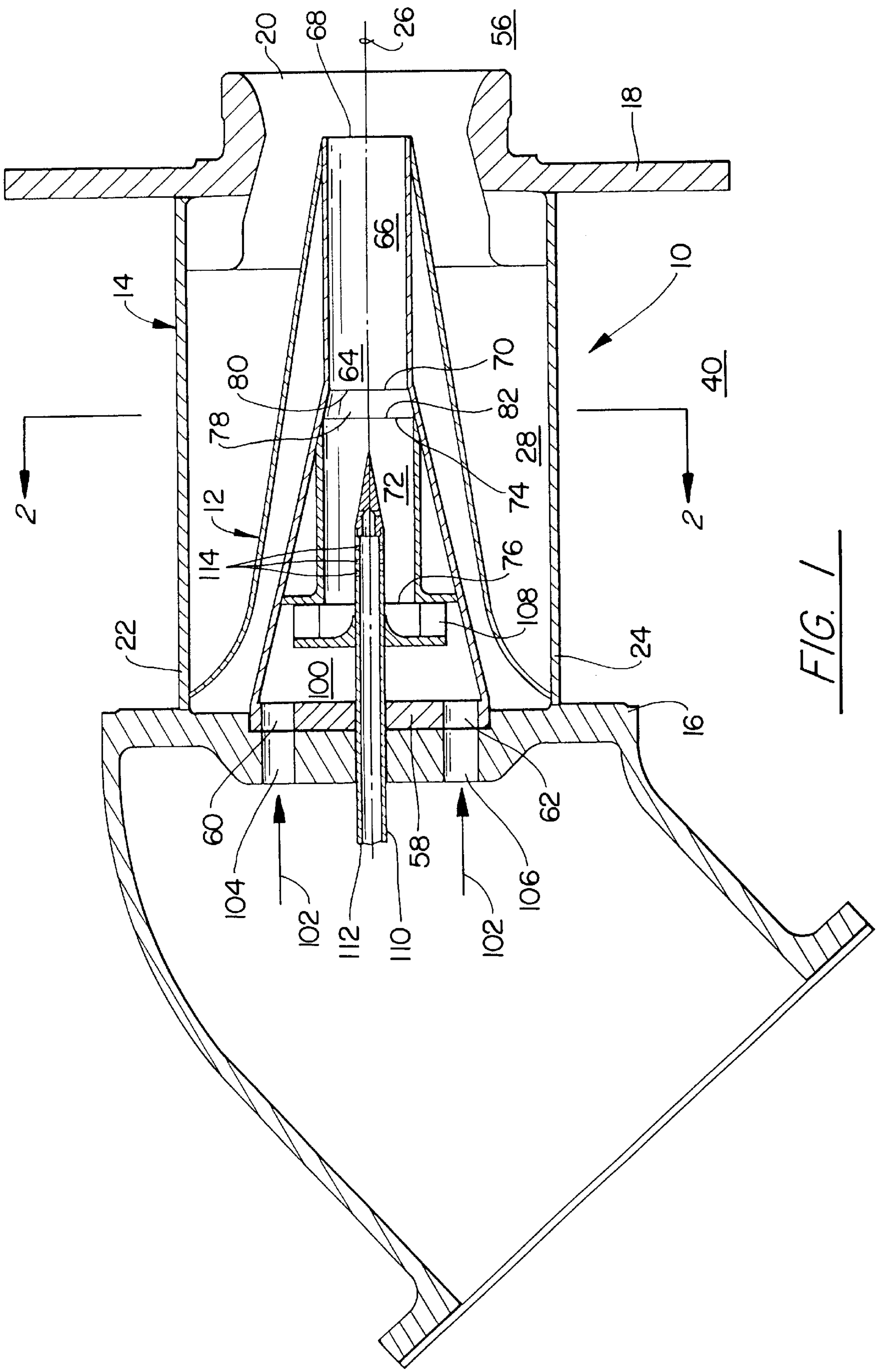
FIG. 1 is a cross-sectional view of the fuel nozzle of the present invention, taken along line 1—1 of FIG. 2.

Referring to FIG. 1, the low NOx premix fuel nozzle 10 of the present invention includes a centerbody 12 within a scroll swirler 14. The scroll swirler 14 includes first and second endplates 16,18, and the first endplate is connected to the centerbody 12 and is in spaced relation to the second endplate 18, which has a combustor inlet port 20 extending therethrough. A plurality, and preferably two, cylindrical-arc scroll members 22, 24 extend from the first endplate 16 to the second endplate 18.

Figure 2:
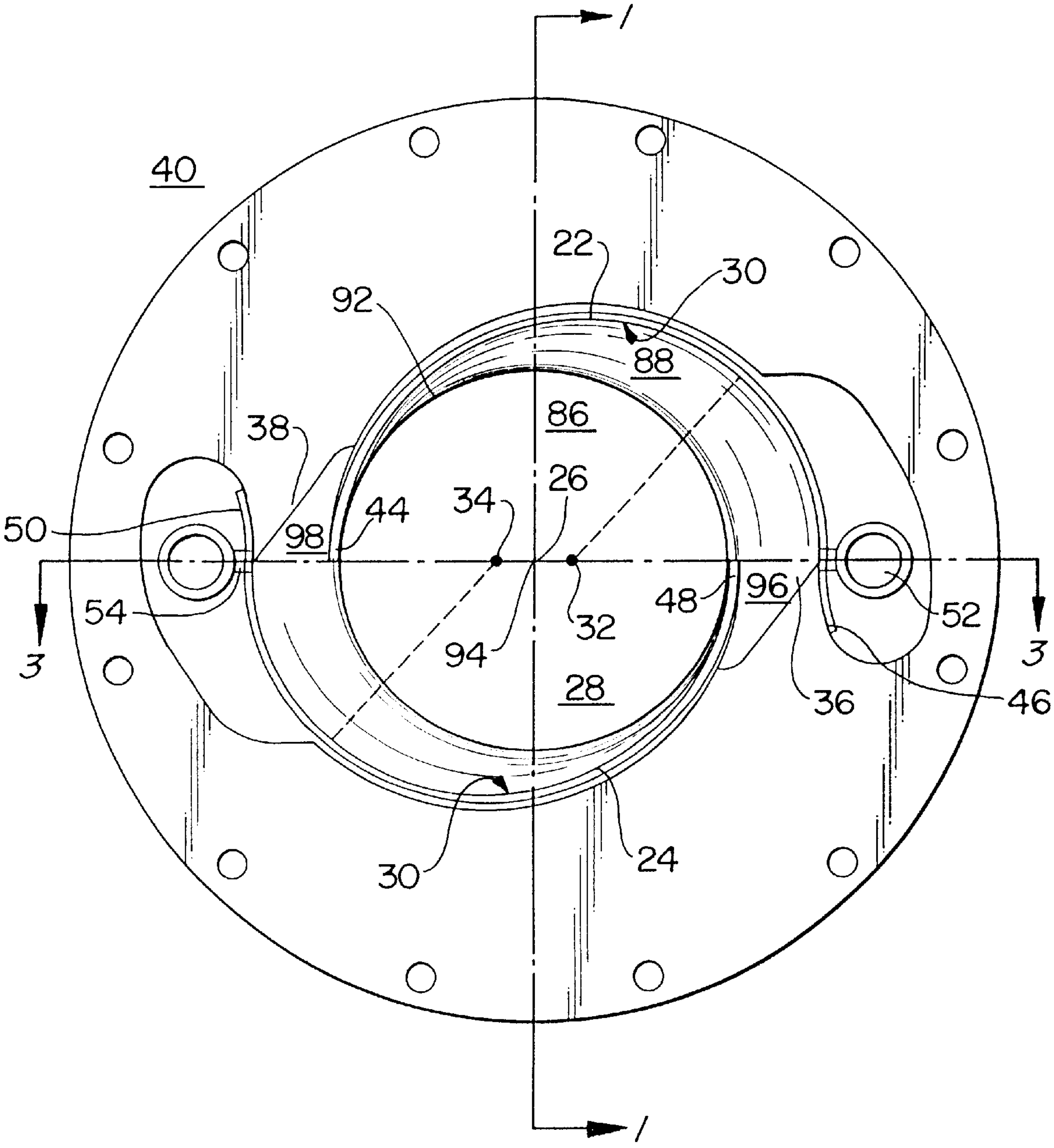
FIG. 2 is a cross-sectional view taken along line 2—2 of FIG. 1.

The scroll members 22, 24 are spaced uniformly about the longitudinal axis 26 of the nozzle 10 thereby defining a mixing zone 28 therebetween, as shown in FIG. 2. Each scroll member 22, 24 has a radially inner surface which faces the longitudinal axis 26 and defines a surface of partial revolution about a centerline 32, 34. As used herein, the term "surface of partial revolution" means a surface generated by rotating a line less than one complete revolution about one of the centerlines 32, 34.

Figure 3:
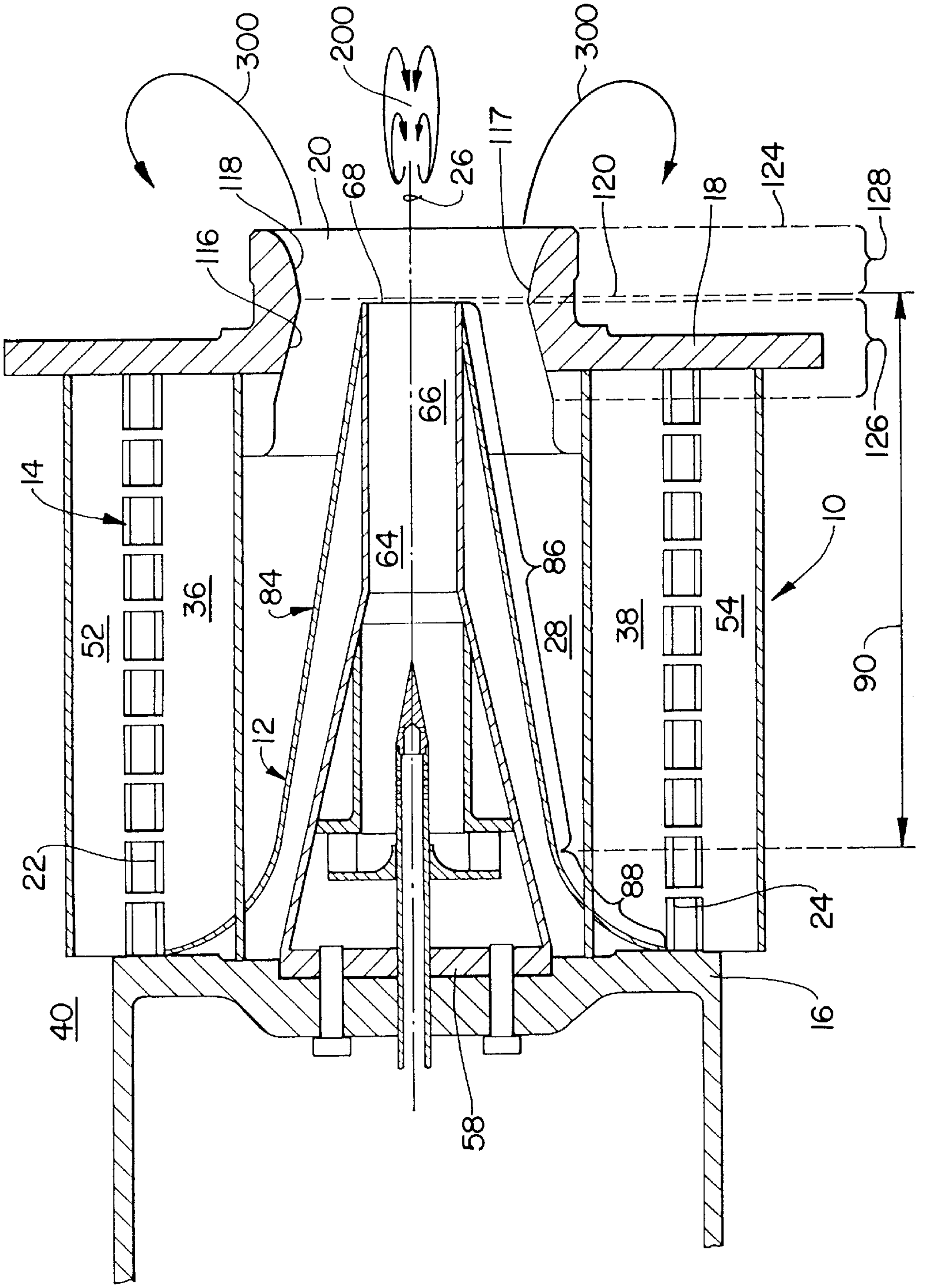
FIG. 3 is a cross-sectional view of the fuel nozzle of the present invention, taken along line 3—3 of FIG. 2.

Each scroll member 22 is in spaced relation to the other scroll member 24, and the centerline 32, 34 of each of the scroll members 22, 24 is located within the mixing zone 28, as shown in FIG. 2. Referring to FIG. 3, each of the centerlines 32, 34 is parallel, and in spaced relation, to the longitudinal axis 26, and all of the centerlines 32, 34 are located equidistant from the longitudinal axis 26, thereby defining inlet slots 36, 38 extending parallel to the longitudinal axis 26 between each pair of adjacent scroll members 22, 24 for introducing combustion air 40 into the mixing zone 28. Combustion supporting air 42 from the compressor (not shown) passes through the inlet slots 36, 38 formed by the overlapping ends 44, 50, 48, 46 of the scroll members 22, 24 with offset centerlines 32, 34.

Each of the scroll members 22, 24 further includes a fuel conduit 52, 54 for introducing fuel into the combustion air 40 as it is introduced into the mixing zone 28 through one of the inlet slots 36, 38. A first fuel supply line (not shown), which may supply either a liquid or gas fuel, but preferably gas, is connected to the each of the fuel conduits 52, 54. The combustor inlet port 20, which is coaxial with the longitudinal axis 26, is located immediately adjacent the combustor 56 to discharge the fuel and combustion air from the present invention into the combustor 56, where combustion of the fuel and air takes place.

Referring back to FIG. 1, the centerbody 12 has a base 58 that has at least one, and preferably a plurality, of air supply ports 60, 62 extending therethrough, and the base 58 is perpendicular to the longitudinal axis 26 extending therethrough. The centerbody 12 also has an internal passageway 64 that is coaxial with the longitudinal axis 26 and discharges into the combustor inlet port 20. The air passing through the internal passageway 64, which is preferably co-rotating with the combustion air entering through the inlet slots 36, 38 but may be counter-rotating or non-rotating, may or may not be fueled. If fueling of the centerbody is desired, in the preferred embodiment of the invention, the internal passageway 64 includes a first cylindrical passage 66 having a first end 68 and a second end 70, and a second cylindrical passage 72 of greater diameter than the first cylindrical passage 66 and likewise having a first end 74 and a second end 76. The second cylindrical passage 72 communicates with the first cylindrical passage 66 through a tapered passage 78 having a first end 80 that has a diameter equal to the diameter of the first cylindrical passage 66, and a second end 82 that has a diameter equal to the diameter of the second cylindrical passage 72. Each of the passages 66, 72, 78 is coaxial with the longitudinal axis 26, and the first end 80 of the tapered passage 78 is integral with the second end 70 of the first cylindrical passage 66, while the second end 82 of the tapered passage 78 is integral with the first end 74 of the second cylindrical passage 72. The first cylindrical passage 66 includes a discharge orifice 68 that is circular and coaxial with the longitudinal axis 26, and is located at the first end 68 of the first cylindrical passage 66.

Referring to FIG. 3, the radially outer surface 84 of the centerbody 12 includes a frustum portion 86, which defines the outer surface of a frustum that is coaxial with the longitudinal axis 26 and flares toward the base 58, and a curved portion 88 which is integral with the frustum portion 86 and preferably defines a portion of the surface generated by rotating a circle, which is tangent to the frustum portion 86 and has a center which lies radially outward thereof, about the longitudinal axis 26. In the preferred embodiment, the frustum portion 86 terminates at the plane within which the discharge orifice 68 is located, the diameter of the base (not to be confused with the base 58 of the centerbody) of the frustum portion 86 is 2.65 times greater than the diameter of the frustum portion 86 at the apex thereof, and the height 90 of the frustum portion 86 (the distance between the plane in which the base of the frustum portion 86 is located and the plane in which the apex of the frustum portion 86 is located) is approximately 1.90 times the diameter of the frustum portion 86 at the base thereof. As described in further detail below, the curved portion 88, which is located between the base 58 and the frustum portion 86, provides a smooth transitional surface that axially turns the combustion air 40 entering the tangential entry nozzle 10 adjacent the base 58. As shown in FIG. 3, the internal passageway 64 is located radially inward from the radially outer surface 84 of the centerbody 12, the frustum portion 86 is coaxial with the longitudinal axis 26, and the centerbody 12 is connected to the base 58 such that the frustum portion 86 tapers toward, and terminates at the discharge orifice 68 of the first cylindrical passage 66.

As shown in FIG. 2, the base of the frustum portion 86 fits within a circle 92 inscribed in the mixing zone 28 and having its center 94 on the longitudinal axis 26. As those skilled in the art will readily appreciate, since the mixing zone 28 is not circular in cross section, the curved portion 88 must be cut to fit therein. A ramp portion 96, 98 is left on the curved portion 88 where the curved portion 88 extends into each inlet slot 36, 38, and this portion is machined to form an aerodynamically shaped ramp 96, 98 that directs the air entering the inlet slot 36, 38 away from the base 58 and onto the curved portion 88 within the mixing zone 28.

Referring to FIG. 1, if the centerbody is fueled, an internal chamber 100 is located within the centerbody 12 between the base 58 and the second end 76 of the second cylindrical passage 72, which terminates at the chamber 100. Air 102 is supplied to the chamber 100 through the air supply ports 60, 62 in the base 58 which communicate therewith, and the chamber 100, in turn, supplies air to the internal passageway 64 through the second end 76 of the second cylindrical passage 72. The first endplate 16 has openings 104, 106 therein that are aligned with the air supply ports 60, 62 of the base 58 so as not to interfere with the flow of combustion air 102 from the compressor of the gas turbine engine. A swirler 108, preferably of the radial inflow type known in the art, is coaxial with the longitudinal axis 26 and is located within the chamber 100 immediately adjacent the second end 76 of the second cylindrical passage 72 such that all air entering the internal passageway 64 from the chamber 100 must pass through the swirler 108.

A fuel lance 110, which likewise is coaxial with the longitudinal axis 26, extends through the base 58, the chamber 100, and the swirler 108, and into the second cylindrical passage 72 of the internal passageway 64. The larger diameter of the second cylindrical passage 72 accommodates the cross-sectional area of the fuel-lance 110, so that the flow area within the second cylindrical passage 72 is essentially equal to the flow area of the first cylindrical passage 66. A second fuel supply line (not shown), which may supply either a liquid or gas fuel, is connected to the fuel lance 110 to supply fuel to an inner passage 112 within the fuel lance 110. Fuel jets 114 are located in the fuel lance 110, and provide a pathway for fuel to exit from the fuel lance 110 into the internal passageway 64.

Referring to FIG. 3, the combustor inlet port 20 is coaxial with the longitudinal axis 26 and includes a convergent surface 116 and a discharge surface 118 which extends to the exit plane 124 of the fuel nozzle 10 and controls the amount of isolation between the premixed fuel and air and the combustion products thereof. The convergent surface 116 is substantially conical in shape and tapers toward the discharge surface 118. The discharge surface 118 extends between the intermediate plane 120 and the combustor surface 122 of the combustor port inlet 20, which is perpendicular to the longitudinal axis 26, and defines the exit plane 124 of the fuel nozzle 10 of the present invention. To achieve the desired axial location of the central recirculation zone 200 with respect to the exit plane 124 and to maintain the fuel nozzle airflow capacity, the discharge surface 118 can be optimized from divergent to cylindrical to convergent.

The convergent surface 116 terminates at the intermediate plane 120, where the diameter of the convergent surface 116 is equal to the diameter of the discharge surface 118. As shown in FIG. 3, the intermediate plane 120 is located between the exit plane 124 and the discharge orifice 68 of the internal passageway 64, and the convergent surface 116 is located between the discharge surface 118 and the first endplate 16.

In operation, combustion air from the compressor of the gas turbine engine flows through the openings 104, 106 and the air supply ports 60, 62 in the base 58 and into the internal passageway 64 of the centerbody 12. If the centerbody 12 is fueled, the preferred embodiment includes combustion air from the internal chamber 100 passing through the radial inflow swirler 108 and entering the internal passageway 64 with a substantial tangential velocity, or swirl, relative to the longitudinal axis 26. When this swirling combustion air passes the fuel lance 110, fuel, preferably in gaseous form, is sprayed from the fuel lance 110 into the internal passage 64 and mixes with the swirling combustion air. The mixture of fuel and combustion air then flows from the second cylindrical passage 72 into the first cylindrical passage 66 through the tapered passage 78. The mixture then proceeds down the length of the first cylindrical passage 66, exiting the first cylindrical passage 66 just short of, or at, the intermediate plane 120 of the combustor inlet port 20, providing a central stream of fuel air mixture.

Additional combustion air from the compressor of the gas turbine engine enters the mixing zone 28 through each of the inlet slots 36, 38. Air entering the inlet slots 36, 38 immediately adjacent the base 58 is directed by the ramps 96, 98 onto the curved portion 88 within the mixing zone 28 of the scroll swirler 14. Fuel, preferably gaseous fuel, supplied to the fuel conduits 52, 54 is sprayed into the combustion air passing through the inlet slots 36, 38 and begins mixing therewith. Due to the shape of the scroll members 22, 24, this mixture establishes an annular stream swirling about the centerbody 12, and the fuel/air mixture continues to mix as it swirls thereabout while progressing along the longitudinal axis 26 toward the combustor inlet port 20.

The swirl of the annular stream produced by the scroll swirler 14 is preferably corotational with the swirl of the fuel/air mixture in the first cylindrical passage 66, and preferably has an angular velocity at least as great as the angular velocity of the of the fuel/air mixture in the first cylindrical passage 66. Due to the shape of the centerbody 12, the axial velocity of the annular stream is maintained at speeds which prevent the combustor flame from migrating into the scroll swirler 14 and stabilizing within the mixing zone 28 of the fuel nozzle 10. Upon exiting the first cylindrical passage 66, the swirling fuel/air mixture (or unfueled air stream) of the central stream is surrounded by the annular stream of the scroll swirler 14, and the two streams enter the intermediate plane 120 of the combustor inlet port 20.

The present invention significantly increases useful life of the centerbody 12 by significantly increasing the axial velocity of the fuel/air mixture swirling about the centerbody 12. The increased axial velocity results from the curved portion 88, which prevents air entering the mixing zone 28 through the inlet slots 36, 38 immediately adjacent the base 58 from recirculating with little or no axial velocity, and the frustum portion 86, which maintains the axial velocity of the annular stream at speeds which prevent attachment of a flame to the centerbody 12, and tend to disgorge the flame if it does attach thereto.

Although this invention has been shown and described with respect to a detailed embodiment thereof, it will be understood by those skilled in the art that various changes in form and detail thereof may be made without departing from the spirit and scope of the claimed invention.

We claim:

1. A method for burning fuel in the combustor of a gas turbine engine with a premixing type of combustion, comprising providing scroll swirler having first and second endplates, said first endplate in spaced relation to said second endplate defining a substantially cylindrical mixing zone therebetween, said second endplate having a combustor inlet port extending therethrough;

providing a centerbody located within said mixing zone and having a radially outer surface that tapers toward the combustor inlet and extends substantially the entire length of the mixing zone;

introducing a first portion of combustion air tangentially into said mixing zone substantially continuously along the length thereof;

introducing a first portion of fuel into said combustion air as said combustion air is introduced into said mixing zone;

mixing said combustion air and fuel by swirling said combustion air and fuel about said centerbody while flowing said combustion air and fuel towards said combustor inlet;

flowing said first portion of combustion air into said combustor inlet;

introducing a second portion of combustion air into said centerbody;

introducing a second portion of fuel into said second portion of combustion air within said centerbody;

mixing said second portion of fuel with said second portion of combustion air within said centerbody;

introducing said second portion of combustion air into said first portion radially inward thereof at said combustor inlet; and, burning said fuel external of said mixing zone.

* * * * *